United States Patent
Iwanami et al.

(10) Patent No.: US 9,737,881 B2
(45) Date of Patent: Aug. 22, 2017

(54) METHOD OF PRODUCING REGENERATED HYDROTREATING CATALYST AND METHOD OF PRODUCING PETROLEUM PRODUCTS

(75) Inventors: Yoshimu Iwanami, Tokyo (JP); Takashi Sano, Tokyo (JP); Tomohiro Konishi, Tokyo (JP); Makoto Nakamura, Tokyo (JP); Souichirou Konno, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 442 days.

(21) Appl. No.: 13/880,477

(22) PCT Filed: Sep. 14, 2011

(86) PCT No.: PCT/JP2011/071026
§ 371 (c)(1),
(2), (4) Date: May 24, 2013

(87) PCT Pub. No.: WO2012/053299
PCT Pub. Date: Apr. 26, 2012

(65) Prior Publication Data
US 2013/0233769 A1 Sep. 12, 2013

(30) Foreign Application Priority Data

Oct. 22, 2010 (JP) .................. 2010-237538

(51) Int. Cl.
*C10G 45/72* (2006.01)
*B01J 38/02* (2006.01)
(Continued)

(52) U.S. Cl.
CPC ............. *B01J 23/94* (2013.01); *B01J 23/882* (2013.01); *B01J 35/002* (2013.01); *B01J 38/02* (2013.01);
(Continued)

(58) Field of Classification Search
CPC ........ B01J 23/882; B01J 23/94; B01J 35/002; B01J 38/02; B01J 38/12; C10G 45/08;
(Continued)

(56) References Cited

FOREIGN PATENT DOCUMENTS

| JP | 52-68890 A | 6/1977 |
|----|-----------|--------|
| JP | 5-123586 A | 5/1993 |

(Continued)

OTHER PUBLICATIONS

Bogdanor, et al, Characteristics of a Commercially Aged Ni-Mo/Al2O3 Hydrotreating Catalyst: Component Distribution, Coke Characteristics, and Effects of Regeneration, 1986, Ind. Eng. Chem. Prod. Res. Dev., vol. 25, pp. 220-230.*

(Continued)

*Primary Examiner* — Renee Robinson
*Assistant Examiner* — Derek Mueller
(74) *Attorney, Agent, or Firm* — Greenblum & Bernstein, P.L.C.

(57) ABSTRACT

A method of producing a regenerated hydrotreating catalyst, including a first step of preparing a hydrotreating catalyst that has been used for hydrotreatment of a petroleum fraction and has a metal element selected from Group 6 elements of the periodic table; a second step of performing regeneration treatment for part of the catalyst prepared in the first step, then performing X-ray absorption fine structure analysis for the catalyst after the regeneration treatment, and obtaining regeneration treatment conditions in which a ratio IS/IO of a peak intensity IS of a peak attributed to a bond between the metal element and a sulfur atom to a peak intensity IO of a peak attributed to a bond between the metal element and an oxygen atom is in the range of 0.1 to 0.3 in a radial distribution curve obtained from an extended X-ray absorption fine structure spectrum.

5 Claims, 3 Drawing Sheets

(51) Int. Cl.

| | |
|---|---|
| *B01J 23/94* | (2006.01) |
| *B01J 23/882* | (2006.01) |
| *B01J 35/00* | (2006.01) |
| *B01J 38/12* | (2006.01) |
| *C10G 45/08* | (2006.01) |
| *C10G 45/38* | (2006.01) |
| *C10G 45/50* | (2006.01) |
| *C10G 45/12* | (2006.01) |
| *C10G 45/54* | (2006.01) |

(52) U.S. Cl.
CPC ............. *B01J 38/12* (2013.01); *C10G 45/08* (2013.01); *C10G 45/12* (2013.01); *C10G 45/38* (2013.01); *C10G 45/50* (2013.01); *C10G 45/54* (2013.01)

(58) Field of Classification Search
CPC ........ C10G 45/12; C10G 45/38; C10G 45/50; C10G 45/54
See application file for complete search history.

(56) References Cited

FOREIGN PATENT DOCUMENTS

| | | |
|---|---|---|
| JP | 2009-183891 A | 8/2009 |
| JP | 2009-202119 A | 9/2009 |
| JP | 2010-36111 A | 2/2010 |
| JP | 2010-75831 A | 4/2010 |
| JP | 2011-143389 A | 7/2011 |
| RU | 2351634 C2 | 4/2009 |

OTHER PUBLICATIONS

Shang, D.Y., et al., An XPS Study of the Sulfidation-Regeneration Cycle of a Hydroprocessing Catalyst, The Canadian Journal of Chemical Engineering, 1993, vol. 71, pp. 725-733.*
Search report from International Patent Appl. No. PCT/JP2011/071026, mail date is Oct. 25, 2011.
International Preliminary Report on Patentability Appl. No. PCT/JP2011/071026, mail date is May 16, 2013.
Notice of Allowance issued with respect to RU application No. 2013123352, mail date is Aug. 28, 2015.

* cited by examiner

METHOD OF PRODUCING REGENERATED HYDROTREATING CATALYST AND METHOD OF PRODUCING PETROLEUM PRODUCTS

TECHNICAL FIELD

The present invention relates to a method of producing a regenerated hydrotreating catalyst, and a method of producing a petroleum product.

BACKGROUND ART

Sulfur-containing, compounds, nitrogen-containing compounds, oxygen-containing compounds, and the like are contained in crude oil as impurities, and these impurities are also contained in petroleum fractions obtained by fractionating the crude oil. For the above impurities in these petroleum fractions, reducing their content is performed by the step of contacting with a catalyst having hydrotreating activity in the presence of hydrogen, called hydrotreating. Particularly, desulfurization in which the content of sulfur-containing compounds is reduced is well known. Recently, in terms of the reduction of environmental loads, a demand for the restriction and reduction of the content of the above impurities, including sulfur-containing compounds, in petroleum products, has become stricter, and many so-called "sulfur-free" petroleum products have been produced.

When a hydrotreating catalyst used for the hydrotreatment of petroleum fractions described above is used for a certain period, activity decreases due to the deposition of coke and sulfur components, and the like, and therefore, replacement is performed. Particularly, the above "sulfur-free" is required, and high hydrotreating ability is required in facilities for the hydrotreatment of fractions, such as kerosene, light oil, and reduced pressure light oil. As a result, catalyst replacement frequency increases, which, as a result, leads to an increase in catalyst cost and an increase in the amount of the catalyst discarded.

As measures for this, the use of a regenerated catalyst for which a spent hydrotreating catalyst is regenerated (regenerated hydrotreating catalyst) is partly performed in these facilities (for example, see Patent Literatures 1 and 2).

CITATION LIST

Patent Literature

Patent Literature 1: Japanese Patent Application Laid-Open No. 52-68890
Patent Literature 2: Japanese Patent Application Laid-Open No. 5-123586

SUMMARY OF INVENTION

Technical Problem

In conventional regeneration treatment, it has been general to select regeneration treatment conditions in terms of whether deposits of coke can be removed or not, assuming that the main cause of a decrease in activity occurring during the use of a hydrotreating catalyst lies in the deposition of coke. For example, in conventional regeneration treatment, there has been a thought that it is good to set treatment temperature to a temperature as high as possible and set treatment temperature to a time as long as possible.

But, apart from the problem of the removal of deposited coke, regeneration treatment itself may decrease catalytic activity by changing the structure of an active metal supported on a catalyst (the coordination form of the active metal and an oxygen atom, and the like), and the like. In other words, a problem of excessive regeneration treatment is that a hydrotreating catalyst is damaged, and activity that the hydrotreating catalyst intrinsically has is decreased.

It is an object of the present invention to provide a method of producing a regenerated hydrotreating catalyst in which a regenerated hydrotreating catalyst stably having high activity can be produced from a spent hydrotreating catalyst by such regeneration treatment conditions that the hydrotreating catalyst can be sufficiently regenerated, and excessive regeneration treatment is not provided. In addition, it is an object of the present invention to provide a method of producing a petroleum product using a regenerated hydrotreating catalyst produced by the above production method.

Solution to Problem

The present invention provides a method of producing a regenerated hydrotreating catalyst, comprising a first step of preparing a hydrotreating catalyst that has been used for hydrotreatment of a petroleum fraction and has a metal element selected from Group 6 elements of the periodic table; a second step of performing regeneration treatment for part of the above catalyst prepared in the above first step, then performing X-ray absorption fine structure analysis for the above catalyst after the regeneration treatment, and obtaining regeneration treatment conditions in which a ratio $I_S/I_O$ of a peak intensity $I_S$ of a peak attributed to a bond between the above metal element and a sulfur atom to a peak intensity $I_O$ of a peak attributed to a bond between the above metal element and an oxygen atom is in the range of 0.1 to 0.3 in a radial distribution curve obtained from an extended X-ray absorption fine structure spectrum; and a third step of performing regeneration treatment under regeneration treatment conditions determined based on the above second step, for the other part of the above catalyst prepared in the above first step.

In such a production method, the regeneration treatment conditions determined based on the second step are regeneration treatment conditions in which the hydrotreating catalyst can be sufficiently regenerated, and excessive regeneration treatment is not provided. Therefore, a regenerated hydrotreating catalyst regenerated in the third step is a regenerated hydrotreating catalyst stably having high activity.

In addition, conventionally, for regeneration treatment conditions, it has been general to select regeneration treatment conditions in terms of whether deposits of coke can be removed or not, whereas in the present invention, regeneration treatment conditions are selected based on the ratio $I_S/I_O$ in terms of removing the deposition of sulfur. Therefore, in the production method of the present invention, providing excessive regeneration treatment is more reliably prevented compared with conventional methods. In addition, a regenerated hydrotreating catalyst produced by the production method of the present invention has the same level of activity as a hydrotreating catalyst before being used for hydrotreating, and therefore can be preferably used as a catalyst for obtaining a "sulfur-free" product.

In the present invention, it is preferred that the above metal element is molybdenum or tungsten.

The present invention also provides a method of producing a petroleum product, comprising a step of performing hydrotreatment of a petroleum fraction using a regenerated hydrotreating catalyst produced by the production method of the present invention described above. Such a production method is excellent in economy because a regenerated hydrotreating catalyst is used.

Advantageous Effects of Invention

According to the present invention, there is provided a method of producing a regenerated hydrotreating catalyst in which a regenerated hydrotreating catalyst stably having high activity can be produced from a spent hydrotreating catalyst by such regeneration treatment conditions that the hydrotreating catalyst can be sufficiently regenerated, and excessive regeneration treatment is not provided. In addition, there is provided a method of producing a petroleum product using a regenerated hydrotreating catalyst produced by the above production method.

DESCRIPTION OF EMBODIMENTS

Figure 1:
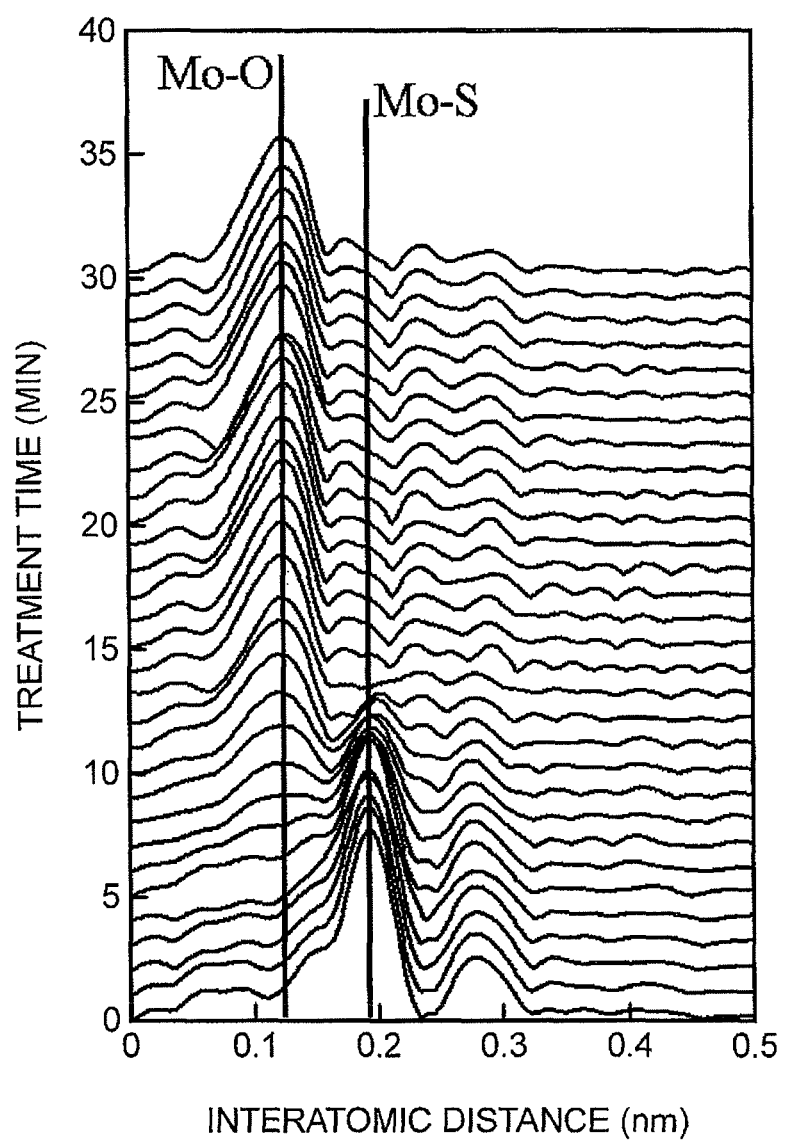
FIG. 1 is a diagram showing changes in radial distribution curves over time in Example 1.

A preferred embodiment of the present invention will be described in detail below.

(Hydrotreating Catalyst)

In this embodiment, a hydrotreating catalyst has a metal element selected from the Group 6 elements of the periodic table (hereinafter sometimes referred to as a "metal element M"). Here, examples of the metal element selected from the Group 6 elements of the periodic table include chromium (Cr), molybdenum (Mo), and tungsten (W). Here, the periodic table refers to a long-form periodic table defined by the International Union of Pure and Applied Chemistry (IUPAC). The hydrotreating catalyst preferably has molybdenum or tungsten, more preferably molybdenum, as the metal element selected from the Group 6 elements of the periodic table.

Examples of the hydrotreating catalyst include a catalyst having an inorganic support and a metal element selected from the Group 6 elements of the periodic table, supported on the inorganic support.

In the hydrotreating catalyst, the amount of the supported metal element selected from the Group 6 elements of the periodic table is preferably 5 to 40% by mass, more preferably 10 to 30% by mass, in terms of an oxide of the metal element, based on the total mass of the hydrotreating catalyst.

As the inorganic support, an inorganic support comprising aluminum oxide is preferred. Examples of such an inorganic support include alumina, alumina-silica, alumina-boria, alumina-titania, alumina-zirconia, alumina-magnesia, alumina-silica-zirconia, and alumina-silica-titania. In addition, supports in which porous inorganic compounds, such as various clay minerals (various zeolites, sepiolites, montmorillonites, and the like), are added to alumina can also be used. Among these, alumina is preferred as the inorganic support.

Other than the metal element selected from the Group 6 elements of the periodic table, one or two or more metal elements selected from the Group 8 to 10 elements of the periodic table may be further supported on the inorganic support. Examples of the metal element selected from the Group 8 to 10 elements of the periodic table include iron (Fe), ruthenium (Ru), osmium (Os), cobalt (Co), rhodium (Rh), iridium (Ir), nickel (Ni), palladium (Pd), and platinum (Pt). Among these, it is preferred to comprise a metal element selected from iron, cobalt, and nickel, it is more preferred to comprise a metal element selected from cobalt and nickel, and it is further preferred to comprise cobalt. In this embodiment, as the combination of metal elements supported on the inorganic support, cobalt-molybdenum, nickel-molybdenum, cobalt-molybdenum-nickel, cobalt-tungsten-nickel, and the like are preferably used.

The amount of the supported metal element selected from the Group 8 to 10 elements of the periodic table is preferably 0.1 to 20% by mass, more preferably 0.5 to 10% by mass, in terms of an oxide of the metal element, based on the total mass of the hydrotreating catalyst.

Examples of the hydrotreating catalyst that is unused (unused catalyst) include a catalyst obtained by supporting 5 to 40% by mass of a metal element selected from the Group 6 elements of the periodic table, as an oxide, and 0.1 to 20% by mass of a metal element selected from the Group 8 to 10 elements of the periodic table, as an oxide, on an inorganic support.

As a precursor of the metal element used when supported on the inorganic support, for example, inorganic salts and organometallic compounds of the metal element are used. Among these, water-soluble inorganic salts are preferred. The support of the metal element is preferably performed using a solution (preferably an aqueous solution) of the above precursor. As support operation, known methods, for example, an immersion method, an impregnation method, and a coprecipitation method, are preferably used.

It is preferred that the support on which the metal element is supported is dried, and then preferably calcined in the presence of oxygen, and the metal element is turned into an oxide once. Further, it is preferred that before the hydrotreatment of a petroleum fraction is performed, the metal element is turned into a sulfide by sulfurization treatment called presulfiding.

(Hydrotreating Step)

In the step of hydrotreating a petroleum fraction, it is preferred to perform the presulfiding of a catalyst charged into a hydrotreating facility, before a hydrotreating reaction, to turn a metal element in the catalyst into a metal sulfide.

The conditions of the presulfiding are not particularly limited, and it is preferred to add a sulfur compound to feed oil used in the hydrotreatment of a petroleum fraction and continuously contact the mixture with the catalyst under the conditions of a temperature of 200 to 380° C., an LHSV (Liquid Hourly Space Velocity) of 1 to 2 $h^{-1}$, the same pressure as during hydrotreating operation, and a treatment time of 48 hours or more. The sulfur compound added to the feed oil is not limited, and dimethyl disulfide (DMDS), hydrogen sulfide, and the like are preferred, and it is preferred to add about 1% by mass of these, based on the mass of the feed oil, to the feed oil.

Operation conditions in the step of hydrotreating a petroleum fraction are not particularly limited, and for the purpose of maintaining a state in which the metal element of the catalyst is a sulfide, a small amount of a sulfur compound, such as DMDS, may be added to the feed oil, but it is preferable that the sulfur compound is not particularly added because generally, the state in which the metal element of the catalyst is a sulfide can be maintained by the sulfur compound already contained in the feed oil.

Hydrogen partial pressure at a reactor inlet in the hydrotreating step is preferably 3 to 13 MPa, more preferably 3.5 to 12 MPa, and further preferably 4 to 11 MPa. When the hydrogen partial pressure is less than 3 MPa, coke production on the catalyst becomes intense, and there is a tendency that catalyst life shortens. On the other hand, when the hydrogen partial pressure is more than 13 MPa, the construction cost of the reactor, peripheral equipment, and the like increases, and there is a fear that economy is lost.

LHSV in the hydrotreating step can be performed in the range of preferably 0.05 to 5 $h^{-1}$, more preferably 0.1 to 4.5 $h^{-1}$, and further preferably 0.2 to 4 $h^{-1}$. When the LHSV is less than 0.05 $h^{-1}$, the construction cost of the reactor becomes excessive, and there is a fear that economy is lost. On the other hand, when the LHSV is more than 5 $h^{-1}$, there is a fear that the hydrotreatment of the feed oil is not sufficiently achieved.

Hydrotreating reaction temperature in the hydrotreating step is preferably 200° C. to 410° C., more preferably 220° C. to 400° C., and further preferably 250° C. to 395° C. When the reaction temperature is less than 200° C., there is a tendency that the hydrotreatment of the feed oil is not sufficiently achieved. On the other hand, when the reaction temperature is more than 410° C., the generation of gas components that are by-products increases, and therefore, the yield of targeted refined oil decreases, which is not desired.

A hydrogen/oil ratio in the hydrotreating step can be effected in the range of preferably 100 to 8000 SCF/BBL (17 to 1400 NL/L), more preferably 120 to 7000 SCF/BBL (20 to 1200 NL/L), and further preferably 150 to 6000 SCF/BBL (25 to 1050 NL/L). When the hydrogen/oil ratio is less than 100 SCF/BBL (17 NL/L), coke production on the catalyst at a reactor outlet proceeds, and there is a tendency that catalyst life shortens. On the other hand, when the hydrogen/oil ratio is more than 8000 SCF/BBL (1400 NL/L), the construction cost of a recycle compressor becomes excessive, and there is a fear that economy is lost.

A reaction form in the hydrotreating step is not particularly limited, and can be selected from various processes, such as a fixed bed and a moving bed, and a fixed bed is preferred. In addition, it is preferred that the reactor is in the tower type reactor.

As the feed oil subjected to the hydrotreatment of a petroleum fraction, one in which distillation temperature in a distillation test is preferably in the range of 130 to 700° C., further preferably 140 to 680° C., and particularly preferably 150 to 660° C. is used. When feed oil in which the distillation temperature is less than 130° C. is used, a hydrotreating reaction is a reaction in a gas phase, and there is a tendency that performance is not sufficiently exhibited with the above catalyst. On the other hand, when feed oil in which the distillation temperature is more than 700° C. is used, the content of poisoning substances for the catalyst, such as heavy metals, contained in the feed oil, increases, and the life of the catalyst may decrease largely. Other properties of the petroleum fraction used as the feed oil are not particularly limited, and as typical properties, density at 15° C. is 0.8200 to 0.9700 g/cm$^3$, and sulfur content is 1.0 to 4.0% by mass.

Here, the sulfur content means sulfur content measured according to "Energy-dispersive X-ray fluorescence method" in "Crude oil and petroleum products—Determination of sulfur content" defined in JIS K 2541. In addition, the distillation test means one performed according to "Determination of distillation characteristics at reduced pressures" or "Determination of distillation characteristics by gas chromatography" in "Petroleum products—Determination of distillation characteristics" defined in JIS K 2254. The density at 15° C. means density measured according to "Oscillating Determination of density" in "Crude petroleum and petroleum products—Determination of density and Petroleum measurement tables" defined in JIS K2249.

(Method of Producing Regenerated Hydrotreating Catalyst)

A method of producing a regenerated hydrotreating catalyst according to this embodiment comprises the first step of preparing a hydrotreating catalyst that has been used for the hydrotreatment of a petroleum fraction and has a metal element selected from the Group 6 elements of the periodic table (hereinafter a "spent catalyst"); the second step of performing regeneration treatment for part of the catalyst prepared in the first step, then performing X-ray absorption fine structure analysis for the catalyst after the regeneration treatment, and obtaining regeneration treatment conditions in which the ratio $I_S/I_O$ of the peak intensity $I_S$ of a peak attributed to a bond between the above metal element and a sulfur atom to the peak intensity $I_O$ of a peak attributed to a bond between the above metal element and an oxygen atom is in the range of 0.1 to 0.3 in a radial distribution curve obtained from an extended X-ray absorption fine structure spectrum; and the third step of performing regeneration treatment under regeneration treatment conditions determined based on the second step, for the other part of the catalyst prepared in the first step.

In this embodiment, the regeneration treatment conditions determined based on the second step are regeneration treatment conditions in which the hydrotreating catalyst can be sufficiently regenerated, and excessive regeneration treatment is not provided. Therefore, a regenerated hydrotreating catalyst regenerated in the third step is a regenerated hydrotreating catalyst stably having high activity.

In addition, conventionally, for regeneration treatment conditions, it has been general to select regeneration treatment conditions in terms of whether deposits of coke can be removed or not, whereas in the present invention, regeneration treatment conditions are selected based on the ratio $I_S/I_O$ in terms of removing the deposition of sulfur. Therefore, in the production method of the present invention, providing excessive regeneration treatment is more reliably prevented compared with conventional methods. In addition, a regenerated hydrotreating catalyst produced by the production method of the present invention has the same level of activity as a hydrotreating catalyst before being used for hydrotreating, and therefore can be preferably used as a catalyst for obtaining a "sulfur-free" product.

The X-ray absorption fine structure (XAFS) analysis in the second step is a method in which a substance to be analyzed is irradiated with X-rays contained in synchrotron radiation generated by an electron accelerator, or X-rays corresponding to the X-rays, with energy changed, and the structure of the substance is analyzed by an absorption spectrum (XAFS spectrum) in which the X-ray absorptivity of the substance is plotted on the X-ray energy. The extended X-ray absorption fine structure (EXAFS, spectrum is a spectrum in a region on a higher energy side than a region in which the X-ray absorptivity changes suddenly with respect to the irradiation X-ray energy (absorption edge), in the XAFS spectrum. By Fourier transforming this EXAFS spectrum, a radial distribution curve can be obtained.

From the radial distribution curve obtained in this manner, information regarding a structure around an atom to be measured can be obtained. In this embodiment, attention is paid to a peak attributed to a bond between the metal element selected from the Group 6 elements of the periodic table and an oxygen atom, and a peak attributed to a bond between the metal element selected from the Group 6 elements of the periodic table and a sulfur atom, in the radial distribution curve, and the peak intensities $I_O$ and $I_S$ of these peaks are obtained.

In this embodiment, the above ratio $I_S/I_O$ needs to be in the range of 0.1 to 0.3, and is more preferably in the range of 0.1 to 0.2, further preferably 0.1 to 0.15. When the ratio $I_S/I_O$ is in the above range, an obtained regeneration treatment catalyst has higher activity.

When the metal element selected from the Group 6 elements of the periodic table is molybdenum, the XAFS analysis in the present invention can be carried out by the following method.

X-ray source: continuous X-rays
Analyzing crystal: Si(311)
Beam size: 1 mm×2 mm
Detector: ionization chamber
Measurement atmosphere: the air
Dwell time: 1 sec
Measurement range: Mo K absorption edge (19500 to 21200 eV)
Data analysis (Fourier transform) program: REX2000 (manufactured by Rigaku)

In addition, for the details of data analysis, such as the way of taking a baseline when extracting an EXAFS spectrum, data analysis can be performed according to a method described in "X-Ray Absorption Spectroscopy—XAFS and Its Applications—edited by Toshiaki Ohta, published by Industrial Publishing & Consulting, Inc. (2002), pp. 57 to 61" using the XAFS analysis integrated software REX2000 (manufactured by Rigaku). This method was also used in Examples described later.

When the metal element selected from the Group 6 elements of the periodic table is tungsten, the XAFS analysis in the present invention can be carried out by the following method.

X-ray source: continuous X-rays
Analyzing crystal: Si(311)
Beam size: 1 mm×2 mm
Detector: ionization chamber
Measurement atmosphere: the air
Dwell time: 1 sec
Measurement range: W L3 absorption edge (9700 to 101400 eV)
Data analysis (Fourier transform) program: REX2000 (manufactured by Rigaku)

The details of data analysis, such as the way of taking a baseline when extracting an EXAFS spectrum, are similar to the above.

When the metal element selected from the Group 6 elements of the periodic table is chromium, the XAFS analysis in the present invention can be carried out by the following method.

X-ray source: continuous X-rays
Analyzing crystal: Si(111)
Beam size: 1 mm×2 mm
Detector: ionization chamber
Measurement atmosphere: the air
Dwell time: 1 sec
Measurement range: Cr K absorption edge (5500 to 7200 eV)
Data analysis (Fourier transform) program: REX2000 (manufactured by Rigaku)

The details of data analysis, such as the way of taking a baseline when extracting an EXAFS spectrum, are similar to the above.

When the hydrotreating catalyst has two or more metal elements selected from the Group 6 elements of the periodic table, the second step is carried out for a metal element in which content in terms of an oxide is highest, among the metal elements.

The position of a peak attributed to a bond between each metal element and an oxygen atom or a sulfur atom can be easily determined by those skilled in the art, and for example, when the metal element selected from the Group 6 elements of the periodic table is molybdenum, a peak attributed to a bond between molybdenum and an oxygen atom (hereinafter a "Mo—O bond"), in a radial distribution curve, is generally at an interatomic distance in the range of 0.1 to 0.15 nm. In addition, a peak attributed to a bond between molybdenum and a sulfur atom (hereinafter a "Mo—S bond") is generally at an interatomic distance in the range of 0.18 to 0.22 nm.

The first to third steps will be described in detail below.

(First Step)

In the first step, a spent catalyst is prepared, and part of the spent catalyst prepared in the first step is subjected to the second step, and the other part is subjected to the third step.

Here, the spent catalyst does not necessarily indicate only hydrotreating catalysts that have been simultaneously used for one hydrotreating. The spent catalyst may include a plurality of hydrotreating catalysts that have been used for similar or analogous hydrotreating. For example, it is also possible to subject a hydrotreating catalyst that has been used for first hydrotreating to the second step and subject a hydrotreating catalyst that has been used for second or subsequent hydrotreating to the third step.

(Second Step)

In the second step, regeneration treatment conditions in which the above peak intensity ratio $I_S/I_O$ is in the range of 0.1 to 0.3 are obtained. A method of obtaining the regeneration treatment conditions is not limited, and examples thereof include methods described in the following methods (1), (2), (3), and (4).

Method (1):

Part of the spent catalyst is divided into a plurality of samples, and for each sample, regeneration treatment is performed with treatment temperature changed and regeneration treatment conditions other than the treatment temperature (treatment time, a treatment atmosphere, and the like) unchanged. After the regeneration treatment, for each sample, the ratio $I_S/I_O$ is obtained, and treatment time in which the ratio $I_S/I_O$ is in the range of 0.1 to 0.3 is obtained.

According to the method (1), treatment temperature required when regeneration treatment is performed under predetermined conditions (treatment time, a treatment atmosphere, and the like) can be obtained. In addition, specifically, the lowest treatment temperature and the highest treatment temperature when regeneration treatment is performed under predetermined conditions can be obtained.

Method (2):

Part of the spent catalyst is divided into a plurality of samples, and for each sample, regeneration treatment is performed with treatment time changed and regeneration treatment conditions other than the treatment time (treatment temperature, a treatment atmosphere, and the like) unchanged. After the regeneration treatment, for each sample, the ratio $I_S/I_O$ is obtained, and treatment temperature at which the ratio $I_S/I_O$ is in the range of 0.1 to 0.3 is obtained.

According to the method (2), treatment time required when regeneration treatment is performed under predetermined conditions (treatment temperature, a treatment atmosphere, and the like) can be obtained. In addition, specifically, the shortest treatment time and the longest treatment time when regeneration treatment is performed under predetermined conditions can be obtained.

Method (3):

Part of the spent catalyst is placed in a measuring apparatus in which regeneration treatment and X-ray absorption fine structure analysis can be simultaneously performed, and X-ray absorption fine structure analysis is performed at predetermined intervals (for example, every minute) while regeneration treatment is performed. Then, from the results of the X-ray absorption fine structure analysis, changes in the ratio $I_S/I_O$ over time are obtained, and treatment time in which the ratio $I_S/I_O$ is in the range of 0.1 to 0.3 is obtained.

According to the method (3), treatment time (minimum treatment time and maximum treatment time) required when regeneration treatment is performed under predetermined conditions (treatment temperature, a treatment atmosphere, and the like) can be obtained in a short time without performing measurement for a plurality of samples as in the method (2).

Method (4):

Part of the spent catalyst is divided into a plurality of samples, each sample is placed in a measuring apparatus in which regeneration treatment and X-ray absorption fine structure analysis can be simultaneously performed, and X-ray absorption fine structure analysis is performed at predetermined intervals (for example, every minute) while regeneration treatment is performed with treatment temperature changed for each sample. Then, from the results of the X-ray absorption fine structure analysis, changes in the ratio $I_S/I_O$ over time at each treatment temperature are obtained, and treatment time in which the ratio $I_S/I_O$ is in the range of 0.1 to 0.3, at each treatment temperature, is obtained.

According to the method (4), a relationship between treatment temperature and required treatment time becomes clear, and therefore, treatment temperature and treatment time can be appropriately determined based on the relationship.

The second step can also be performed by methods other than the above, and regeneration treatment conditions in which the ratio $I_S/I_O$ is in the range of 0.1 to 0.3 can be determined with various conditions in regeneration treatment changed.

Under regeneration treatment conditions in which the ratio $I_S/I_O$ is larger than 0.3, the spent catalyst cannot be sufficiently regenerated, and sufficient catalytic activity may not be obtained. In addition, under regeneration treatment conditions in which the ratio $I_S/I_O$ is less than 0.1, due to excessive regeneration treatment, the metal elements in the catalyst form complex metal oxides, aggregation is caused, and the like, and the activity of an obtained regenerated catalyst may decrease. In addition, even if such a decrease in the activity of the regenerated catalyst does not occur, economy is impaired by unrequired regeneration treatment.

(Third Step)

In the third step, the regeneration treatment of the spent catalyst is performed under regeneration treatment conditions determined based on the second step.

Here, the "regeneration treatment conditions determined based on the second step" do not necessarily mean applying the regeneration treatment conditions (treatment temperature, treatment time, and the like) in which the ratio $I_S/I_O$ is in the range of 0.1 to 0.3 in the second step as they are.

For example, when a treatment apparatus by which regeneration treatment is performed in the second step (hereinafter a "treatment apparatus A") and a treatment apparatus by which regeneration treatment is performed in the third step (hereinafter a "treatment apparatus B") are different, a correlation between the treatment apparatus A and the treatment apparatus B is previously obtained, and regeneration treatment conditions in the third step can be determined based on the correlation and the regeneration treatment conditions in which the ratio $I_S/I_O$ is in the range of 0.1 to 0.3 in the second step.

For example, when there is a proportional relationship between a treatment time a required when regeneration treatment is performed by the treatment apparatus A, and a treatment time b required when regeneration treatment is performed by the treatment apparatus B, regeneration treatment conditions in the third step can be determined by the following method.

First, a treatment temperature $T_0$ and a treatment time $b_0$ in which regeneration can be sufficiently performed by the treatment apparatus B are previously determined. In addition, a treatment time $a_0$ in which the ratio $I_S/I_O$ is in the range of 0.1 to 0.3 when regeneration treatment is performed at the treatment temperature $T_0$ using the treatment apparatus A is determined.

Thus, a correlation between the treatment time a in the treatment apparatus A and the treatment time b in the treatment apparatus B (proportionality constant ($b_0/a_0$)) can be obtained.

Here, the second step is performed, and a treatment time $a_1$ in which the ratio $I_S/I_O$ is in the range of 0.1 to 0.3 when regeneration treatment is performed at a treatment temperature $T_1$ using the treatment apparatus A is obtained.

Then, regeneration treatment conditions in the third step is determined based on the treatment time $a_1$ obtained in the second step, and the previously obtained correlation (proportionality constant ($b_0/a_0$)). In other words, in the third step, regeneration treatment can be performed under the regeneration treatment conditions of the treatment temperature $T_1$ and the treatment time $a_1 \times (b_0/a_0)$.

Of course, when the treatment apparatus A and the treatment apparatus B are the same treatment apparatus, or the same regeneration treatment conditions can be applied to the treatment apparatus A and the treatment apparatus B, the same regeneration treatment conditions as the regeneration treatment conditions determined in the second step can be applied in the third step.

(Regeneration Treatment)

The regeneration treatment in the second step and the third step will be described in detail below. The specific mode of the regeneration treatment is not particularly limited, and the regeneration treatment can be performed by known regeneration methods.

A facility used for the regeneration treatment is not particularly limited, and it is preferred that the regeneration treatment is performed in a facility different from a facility for the hydrotreatment of a petroleum fraction. In other words, rather than performing regeneration treatment in a state in which the reactor of the facility for the hydrotreatment of a petroleum fraction remains charged with the catalyst, it is preferred to extract the catalyst from the reactor, transfer the extracted catalyst to a facility for regeneration treatment, and perform regeneration treatment by the facility.

A form for performing the regeneration treatment of the spent catalyst is not limited, and is preferably composed of the step of removing from the spent catalyst a pulverized catalyst and fillers and the like other than the catalyst by sieving (removal step), the step of removing oil components attached to the spent catalyst (deoiling step), and the step of removing coke, sulfur components, and the like deposited on the spent catalyst (regeneration step), in this order.

Among these, for the deoiling step, a method of volatilizing oil components by heating the spent catalyst to a temperature of about 200 to 400° C. under an atmosphere in which substantially no oxygen is present, for example, a nitrogen atmosphere, and the like are preferably used. In addition, the deoiling step may be performed by a method of washing oil components with light hydrocarbons, or a method such as the removal of oil components by steaming.

The treatment atmosphere, treatment temperature, and treatment time of the regeneration step can be set as follows. However, the following description does not mean that sufficient catalytic activity can always be provided to the regenerated hydrotreating catalyst when the treatment atmosphere, the treatment temperature, and the treatment time meet respective requirements. Strictly, the regeneration treatment in the third step is performed by regeneration treatment conditions determined based on the second step.

It is preferred that the treatment atmosphere in the regeneration step is an atmosphere in which molecular oxygen is present, and for example, the treatment atmosphere is in air, particularly in an air flow.

In addition, the treatment temperature of the regeneration step is different according to the use history of the spent catalyst, and the like, and is preferably selected in the range of 250 to 700° C., more preferably 260 to 550° C., further preferably 280 to 450° C., and further preferably 300 to 400° C. A method of removing deposited coke, sulfur components, and the like by oxidizing is preferably used. When the treatment temperature is less than the above lower limit temperature, there is a tendency that the removal of substances that have decreased catalytic activity, such as coke and sulfur components, does not proceed efficiently, and the like. On the other hand, when the treatment temperature is more than the above upper limit temperature, the metal elements in the catalyst form complex metal oxides, aggregation is caused, and the like, and the activity of an obtained regenerated hydrotreating catalyst may decrease.

The treatment time of the regeneration step is preferably 0.5 hours or more, more preferably 2 hours or more, further preferably 2.5 hours or more, and particularly preferably 3 hours or more. When the treatment time is less than 0.5 hours, there is a tendency that the removal of substances that have decreased catalytic activity, such as coke and sulfur components, does not proceed efficiently.

(Regenerated Hydrotreating Catalyst)

A regenerated hydrotreating catalyst produced by the production method according to this embodiment is produced by such regeneration treatment conditions that the hydrotreating catalyst can be sufficiently regenerated, and excessive regeneration treatment is not provided, and therefore, the regenerated hydrotreating catalyst has high activity.

The activity of a hydrotreating catalyst can be evaluated, for example, by desulfurization activity. The desulfurization activity is evaluated by a desulfurization rate constant obtained from sulfur component content in a petroleum fraction before hydrotreating, and sulfur component content in the petroleum fraction after hydrotreating.

The efficiency of regeneration treatment can be evaluated by specific activity (relative activity) $S_1/S_0$ in which the desulfurization rate constant $S_0$ of a hydrotreating catalyst before use (unused catalyst) are compared with the desulfurization rate constant $S_1$ of a regenerated hydrotreating catalyst (regenerated catalyst). The specific activity $S_1/S_0$ of the regenerated hydrotreating catalyst produced by the production method according to this embodiment is preferably 0.80 or more, more preferably 0.85 or more.

(Method of Using Regenerated Hydrotreating Catalyst)

Such a regenerated hydrotreating catalyst may be used alone as a catalyst in the step of hydrotreating a petroleum fraction described above, or may be used by laminating it on an unused catalyst. When the regenerated hydrotreating catalyst is used by laminating it on an unused catalyst, the proportion of the regenerated hydrotreating catalyst is not particularly limited, and is preferably 80 or more (mass ratio), more preferably 120 or more (mass ratio), based on 100 of the unused catalyst in terms of a reduction in the amount of the catalyst discarded, the ease of separation of the catalyst during catalyst replacement, and the like. In the use of the regenerated hydrotreating catalyst, hydrotreating can be performed as in the above hydrotreating step.

The preferred embodiment of the present invention has been described above, but the present invention is not limited to the above embodiment. For example, the present invention can also be referred to as a method of determining the conditions of the regeneration treatment of a hydrotreating catalyst, comprising the first step of preparing a hydrotreating catalyst that has been used for the hydrotreatment of a petroleum fraction and has a metal element selected from the Group 6 elements of the periodic table; the second step of performing regeneration treatment for the above catalyst prepared in the first step, then performing X-ray absorption fine structure analysis for the above catalyst after the regeneration treatment, and obtaining the conditions of regeneration treatment in which the ratio $I_S/I_O$ of the peak intensity $I_S$ of a peak attributed to a bond between the above metal element and a sulfur atom to the peak intensity $I_O$ of a peak attributed to a bond between the above metal element and an oxygen atom is in the range of 0.1 to 0.3 in a radial distribution curve obtained from an extended X-ray absorption fine structure spectrum; and the third step of determining the conditions of the regeneration treatment of the hydrotreating catalyst based on conditions obtained in the second step.

In addition, the present invention can also be referred to as a method of producing a regenerated hydrotreating catalyst, comprising the step of regenerating a hydrotreating catalyst that has been used for the hydrotreatment of a petroleum fraction and has a metal element selected from the Group 6 elements of the periodic table, under regeneration treatment conditions determined by the above determination method.

Further, the present invention may be a method of producing a petroleum product, comprising the step of performing the hydrotreatment of a petroleum fraction using a regenerated hydrotreating catalyst produced by the above production method. According to such a production method, a petroleum product can be produced with good economy.

EXAMPLES

The present invention will be more specifically described below by Examples, but the present invention is not limited to the Examples.

Example 1

Unused Catalyst and Spent Catalyst

A catalyst in which molybdenum and cobalt as active metals were supported on an alumina support (unused catalyst, the amount of molybdenum supported (in terms of an oxide): 22.9% by mass, the amount of cobalt supported (in terms of an oxide): 2.5% by mass) was prepared. Next, part of the above catalyst was used for 2 years in a facility for the hydrotreatment of kerosene to obtain a spent catalyst.

(XAFS Analysis)

For part of the above spent catalyst, an in-situ cell for XAFS measurement was installed in the XAFS Experimental Station of the Beamline NW10A of the PF-AR of the High Energy Accelerator Research Organization in order to simultaneously perform regeneration treatment and X-ray absorption fine structure analysis, and while regeneration treatment was performed, XAFS analysis was performed every minute from the start of the regeneration treatment until after a lapse of 30 minutes. From an EXAFS spectrum at a Mo K absorption edge obtained from the result of each XAFS analysis, a radial distribution curve was obtained. Changes in the obtained radial distribution curves over time are shown in FIG. 1.

Figure 2:
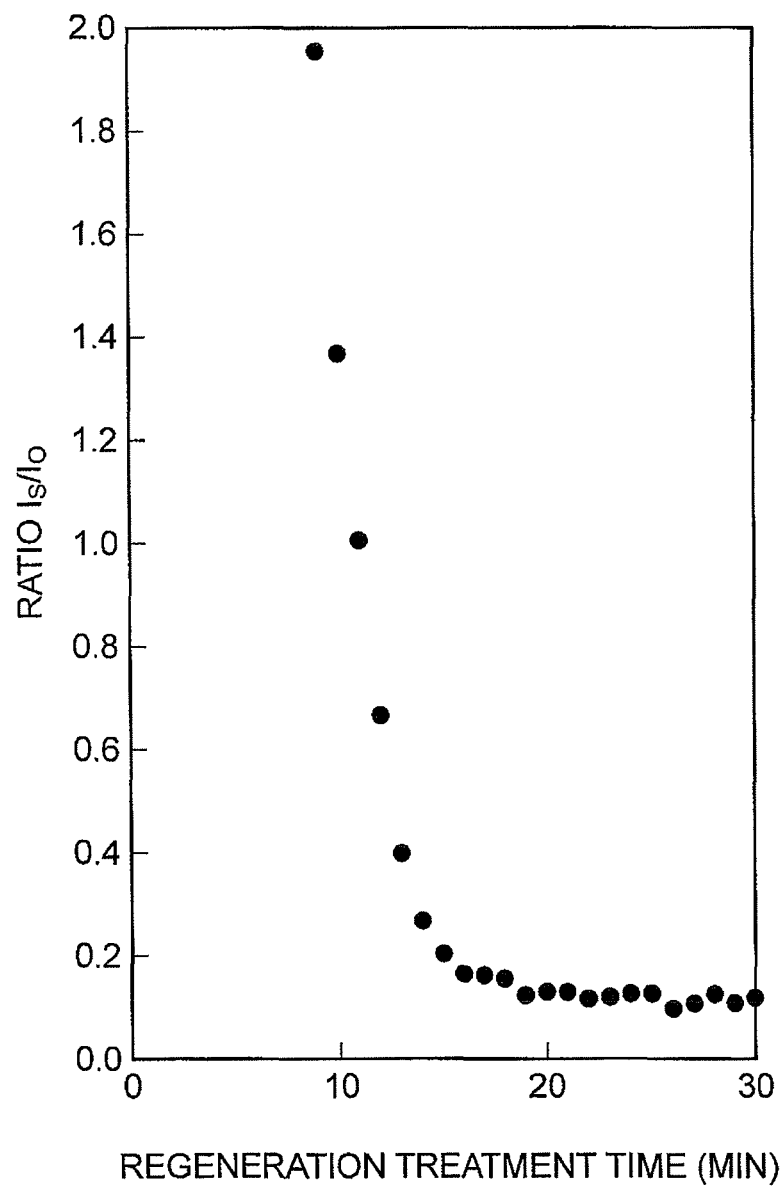
FIG. 2 is a diagram showing a relationship between a ratio $I_S/I_O$ and treatment time in Example 1.

A peak $I_S$ attributed to a Mo—S bond and a peak $I_O$ attributed to a Mo—O bond in the obtained radial distribution curve were obtained, and a ratio $I_S/I_O$ was obtained. A relationship between the ratio $I_S/I_O$ and treatment time is shown in FIG. 2.

(Regeneration Treatment)

Using part of the above spent catalyst, regeneration treatment was performed under regeneration treatment conditions in which the above ratio $I_S/I_O$ was a value shown in Table 1. For obtained regenerated catalysts, catalytic activity was evaluated by the following method.

(Evaluation of Catalytic Activity)

For each of the unused catalyst and the regenerated catalysts, catalytic activity was evaluated as follows. First, a fixed bed continuous flow type reaction apparatus was charged with the catalyst, and the presulfiding of the catalyst was performed. Specifically, to a kerosene fraction, 1% by mass of DMDS based on the mass of the fraction was added, and the mixture was continuously fed to the above catalyst for 48 hours. Then, using the above kerosene fraction (to which DMDS was not added) as feed oil, a hydrotreating reaction was performed at a hydrogen partial pressure of 3 MPa, an LHSV of 1 $h^{-1}$, a hydrogen/oil ratio of 200 NL/L, and a reaction temperature of 300° C. A desulfurization rate constant was obtained from sulfur component content in produced oil. In addition, taking the desulfurization rate constant of the unused catalyst as 1, the specific activity of the regenerated catalysts was obtained. The results are shown in Table 1.

TABLE 1

|  | Regeneration treatment time (min) | Ratio $I_S/I_O$ | Specific activity |
|---|---|---|---|
| Comparative Example 1-1 | 10 min | 1.37 | 0.75 |
| Example 1-1 | 14 min | 0.27 | 0.85 |
| Example 1-2 | 17 min | 0.16 | 0.89 |
| Example 1-3 | 30 min | 0.12 | 0.89 |
| Comparative Example 1-2 | 45 min | 0.08 | 0.78 |

In the regenerated catalyst of Comparative Example 1-1 in which regeneration treatment was performed under regeneration treatment conditions in which the ratio $I_S/I_O$ was a value larger than 0.3, the specific activity was low, and sufficient activity was not obtained. In addition, also in the regenerated catalyst of Comparative Example 1-2 in which regeneration treatment was performed under regeneration treatment conditions in which the ratio $I_S/I_O$ was a value less than 0.1, the specific activity was low, and sufficient activity was not obtained. On the other hand, in Example 1-1, Example 1-2, and Example 1-3 in which regeneration treatment was performed under regeneration treatment conditions in which the ratio $I_S/I_O$ was in the range of 0.1 to 0.3, the specific activity was high, and a regenerated catalyst that was sufficiently regenerated was obtained.

Example 2

XAFS analysis as in Example 1 was performed at a predetermined regeneration treatment temperature $T_1$ ° C., and a relationship between a ratio $I_S/I_O$ and treatment time was obtained. Then, a first treatment time in which the ratio $I_S/I_O$ was 0.3 was taken as a minimum required treatment time $a_1$ at the regeneration treatment temperature $T_1$.

Then, XAFS analysis as in Example 1 was performed at a regeneration treatment temperature $T_2$ ° C. lower than the above $T_1$ by 100° C. ($T_1-100$° C.), and a relationship between a ratio $I_S/I_O$ and treatment time was obtained. Then, a first treatment time in which the ratio $I_S/I_O$ was 0.3 was taken as a minimum required treatment time $a_2$ at the regeneration treatment temperature $T_2$. The ratio $a_2/a_1$ of the minimum required treatment time $a_2$ to the minimum required treatment time $a_1$ was 1.88.

In addition, XAFS analysis as in Example 1 was performed at a regeneration treatment temperature $T_3$ ° C. higher than the above $T_1$ by 100° C. ($T_1+100$° C.), and a relationship between a ratio $I_S/I_O$ and treatment time was obtained. Then, a first treatment time in which the ratio $I_S/I_O$ was 0.3 was taken as a minimum required treatment time $a_3$ at the regeneration treatment temperature $T_3$. The ratio $a_3/a_1$ of the minimum required treatment time $a_3$ to the minimum required treatment time $a_1$ was 0.75.

Figure 3:
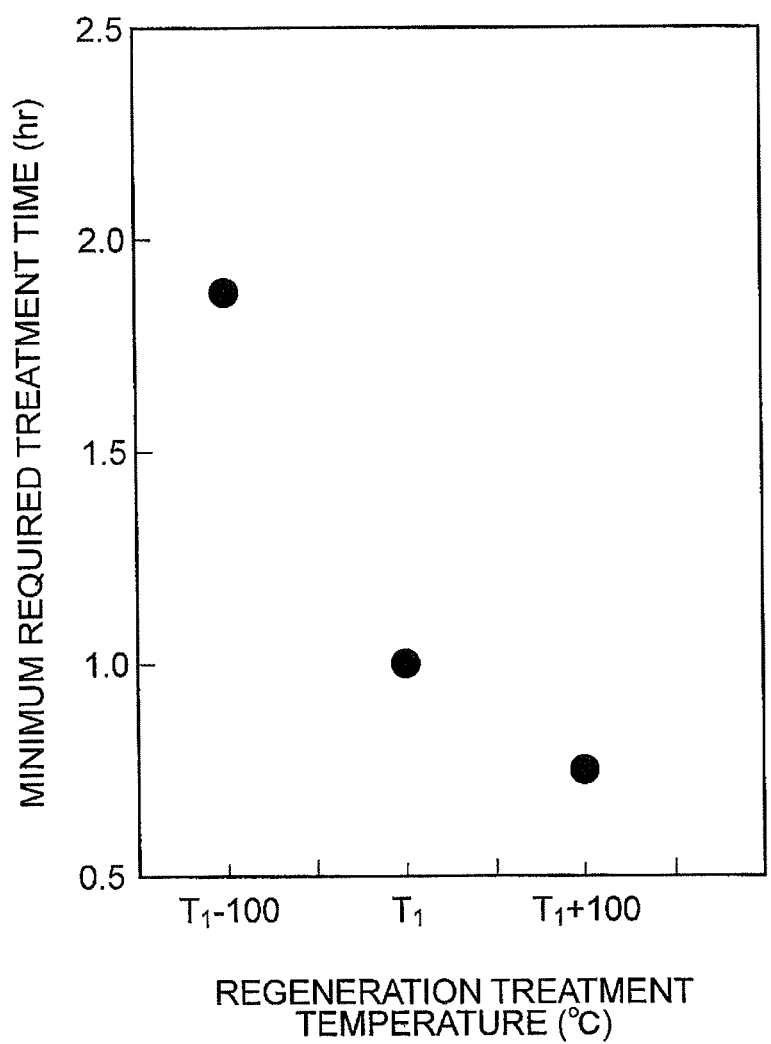
FIG. 3 is a diagram showing a relationship between treatment temperature and minimum required treatment time in Example 2.

A relationship between the treatment temperature and the minimum required treatment time obtained is shown in FIG. 3.

Here, using a regeneration treatment apparatus different from the measuring apparatus in which the above measurement was performed (hereinafter a "regeneration apparatus B"), a treatment time $b_1$ required in regeneration treatment at the regeneration treatment temperature $T_1$ was previously studied. As a result, it was confirmed that when the treatment time $b_1$ was 2 hours, a regenerated catalyst having a specific activity of 0.85 was obtained. In other words, the regeneration apparatus B is an apparatus in which a regenerated catalyst having high activity can be obtained with a treatment time of 2 hours at the regeneration treatment temperature $T_1$.

Example 2-1

When a required treatment time $b_2$ at a regeneration treatment temperature $T_2$ when the regeneration apparatus B was used was obtained by the following formula (1), $b_2=3.76$ hours was obtained.

$$b_2=b_1 \times a_2/a_1 \quad (1)$$

When regeneration treatment was performed at the regeneration treatment temperature $T_2$ for a treatment time of 3.76 hours using the regeneration apparatus B, the specific activity of an obtained regenerated catalyst was 0.89, and a regenerated catalyst having high activity was obtained.

Example 2-2

When a required treatment time $b_3$ at a regeneration treatment temperature $T_3$ when the regeneration apparatus B was used was obtained by the following formula (2), $b_3$=1.50 hours was obtained.

$$b_3 = b_1 \times a_3/a_1 \qquad (2)$$

When regeneration treatment was performed at the regeneration treatment temperature $T_3$ for a treatment time of 1.50 hours using the regeneration apparatus B, the specific activity of an obtained regenerated catalyst was 0.88, and a regenerated catalyst having high activity was obtained.

From the above, according to the present invention, by obtaining a relationship between treatment temperature and required treatment time in regeneration treatment, required treatment time at any treatment temperature can be appropriately obtained.

The invention claimed is:

1. A method of producing a regenerated hydrotreating catalyst, comprising:
   preparing a hydrotreating catalyst that has been used for hydrotreatment of a petroleum fraction and has a metal element selected from Group 6 elements of the periodic table; and then
   performing an initial regeneration treatment for part of the prepared hydrotreating catalyst, then performing X-ray absorption fine structure analysis for the catalyst after the regeneration treatment, and obtaining regeneration treatment conditions in which a ratio $I_S/I_O$ of a peak intensity $I_S$ of a peak attributed to a bond between the metal element and a sulfur atom to a peak intensity $I_O$ of a peak attributed to a bond between the metal element and an oxygen atom is in the range of 0.1 to 0.3 in a radial distribution curve obtained from an extended X-ray absorption fine structure spectrum; and then
   performing another regeneration treatment under regeneration treatment conditions determined based on the results of the initial regeneration and subsequent X-ray absorption fine structure analysis, for another part of the catalyst.

2. The method of producing a regenerated hydrotreating catalyst according to claim 1, wherein the metal element is molybdenum or tungsten.

3. The method of claim 1, wherein the metal element selected from Group 6 elements of the periodic table is tungsten.

4. A method of producing a petroleum product, comprising performing hydrotreatment of a petroleum fraction using a regenerated hydrotreating catalyst produced by the production method according to claim 1.

5. A method of producing a petroleum product, comprising performing hydrotreatment of a petroleum fraction using a regenerated hydrotreating catalyst produced by the production method according to claim 2.

* * * * *